United States Patent [19]
Inoue et al.

[11] Patent Number: 5,856,050
[45] Date of Patent: Jan. 5, 1999

[54] COVERAGE OF PIXEL SHEET WITH PROTECTIVE LAYER

[75] Inventors: Koji Inoue; Masayuki Iwasaki, both of Shizuoka, Japan

[73] Assignee: Fuji Photo Film Co., Ltd., Kanagawa, Japan

[21] Appl. No.: 936,547

[22] Filed: Sep. 24, 1997

[30] Foreign Application Priority Data

Sep. 24, 1996 [JP] Japan ................................. 8-273100

[51] Int. Cl.$^6$ ....................................................... G02B 5/20
[52] U.S. Cl. ................................ 430/7; 430/321; 356/237
[58] Field of Search ................................ 430/7, 321, 30; 356/371, 237

[56] References Cited

U.S. PATENT DOCUMENTS 4,345,011  8/1982  Drexhage ..................................... 430/7
5,540,147  7/1996  Johnson ..................................... 101/211

FOREIGN PATENT DOCUMENTS 4-115202  4/1992  Japan .
4-201478  7/1992  Japan .

*Primary Examiner*—John A. McPherson
*Attorney, Agent, or Firm*—Sixbey, Friedman, Leedom & Ferguson, P.C.; Gerald J. Ferguson, Jr.

[57] ABSTRACT

A photosensitive sheet favorably employable for covering a pixel sheet is composed mainly of a support and a photosensitive colored resin layer containing a dye whose color disappears by application of heat or light. The coverage of the pixel sheet can be performed by combining the pixel sheet and the photosensitive sheet which has been examined for checking evenness of the surface of the colored resin layer under the condition that the pixels are brought into contact with the colored resin layer to give a combined body; separating the support of the photosensitive sheet from the combined body, leaving the colored resin layer on the pixel sheet; exposing to light the photosensitive colored resin layer on the pixel sheet so as to cure the photosensitive colored resin layer and possibly to make the resin layer colorless; and heating the light-exposed colored resin layer so that the colored resin layer is made colorless or the curing further proceeds.

4 Claims, 2 Drawing Sheets

COVERAGE OF PIXEL SHEET WITH PROTECTIVE LAYER

FIELD OF THE INVENTION

The present invention relates to a process for covering a pixel sheet with a protective layer, and relates to a photosensitive sheet favorably employable for the covering process. Particularly, the invention relate to the process and sheet which are favorably employable for the coverage of a color filter for color liquid crystal display device.

BACKGROUND OF THE INVENTION

A color filter employed for a color liquid crystal display device usually comprises red, green and blue pixels formed on a light-transmissive substrate (e.g., glass plate) and a black matrix (black resin layer arranged in the form of grid) provided on a space area between the pixels to improve contrast of a displayed image. On the pixels and black matrix, a protective layer is generally provided in order to render the surface of the pixels and black matrix even, whereby a covered color filter (color filter substrate) is obtained.

The color liquid crystal display device is essentially composed of a liquid crystal cell comprising a color filter substrate having an electrode, a substrate having an opposite electrode and liquid crystal injected into a gap between these substrates, and a polarizing film.

In more detail, the liquid crystal cell is usually prepared by forming transparent electrodes and an orientation layer on the protective layer of the color filter in order, to prepare an color filter substrate having electrode; bonding the color filter substrate to a substrate having an opposite electrode via spacers; and injecting liquid crystal into a gap between these substrates. Further, if desired, the polarizing film and the optical compensatory sheet are provided on upper and under side surfaces of the liquid crystal cell, to prepare a color liquid crystal display device.

When the evenness of the surface of the protective layer is poor, the distances between the substrates (distances of the gap) becomes uneven along the surface plane because the substrates are combined to each other via both protective layers of the substrates intervening therebetween. The uneven distances of gap lowers display characteristics (e.g., giving uneven displayed image).

Therefore, the unevenness of the surface of the protective layer is generally required to be as little as possible, and preferably in the range of+0.1 µm to−0.1 µm in the case of TFT-LCD (thin film transistor type liquid crystal display), and in the range of+0.05 µm to−0.05 µm in the case of STN-LCD (super twisted nematic type liquid crystal display).

The protective layer has been formed by coating a liquid composition formulated for protective layer on the pixels (and black matrix) by means of a coating method such as gravure coating, and exposing the coated layer to light. Recently, Japanese Patent Provisional Publications No. 1(1989)-262502 and No. 4(1992)-115202 have proposed a process of transferring a protective layer onto the pixels, and a process of transferring a photosensitive resin layer onto the pixels and exposing the transferred photosensitive resin layer.

Examination of the surface of the protective layer in connection with its evenness is, for example, carried out by observing interference of light produced when the surface of the protective layer provided on the pixel sheet is irradiated with a monochromatic beam such as a light from a sodium lamp. Otherwise, the examination is conducted by preparing a liquid crystal display device using a color filter provided with a protective layer and actually driving the display device and then finally observing the conditions (e.g., evenness) of an image displayed on the display device by applying a light from the back sidet.

The examination of the surface of the protective layer provided on the pixel sheet using the sodium lamp is not advantageous, because the pixel sheet which is judged to have uneven protective layer thereon cannot be practically used and should be thrown away. Further, the examination requires a skilled art because the interference on the surface of the protective layer varies depending on directions of light applied onto the surface. The examination on the finally assembled liquid crystal display device has a great risk because the display device which is judged to have uneven liquid crystal layer therein cannot be practically employed and should be thrown away.

SUMMARY OF THE INVENTION

The present inventors have studied to solve the above problems. First, it has been assumed that the problems can be solved by directly examining evenness of the surface of the photosensitive resin layer (for forming the protective layer) of the photosensitive sheet which is employed for forming a protective layer on the pixels by a transferring operation. However, when the photosensitive resin layer for forming a protective layer is viewed under visible light, it is difficult to clearly examine the surface of the photosensitive resin layer, particularly in the case that other layers (alkali-soluble thermoplastic resin layer, an oxygen barrier layer) are arranged between the support and the resin layer. Further, even if these other layers are not arranged, it is not easy to clearly examine only the surface of the photosensitive resin layer because the interface between the support and the resin layer also comes simultaneously into sight. The inventors have further studied to find a method of directly examining the photosensitive resin layer, and finally reached the present invention.

An object of the present invention is to provide a photosensitive sheet which is favorably employable for providing an even covering onto a pixel sheet.

Another object of the present invention is to provide an easily employable process for covering a pixel sheet with a protective layer having an even thickness.

There is provided by the present invention a photosensitive sheet which comprises a support and a photosensitive colored resin layer thereon containing a dye whose color disappears by application of heat or light.

Preferred embodiments of the invention are as follows:

1) The photosensitive sheet wherein the photosensitive colored resin layer comprises the dye, an alkali-soluble polymer, a photopolymerizable monomer having an ethylenically unsaturated double bond and a photopolymerization initiator.

2) The photosensitive sheet wherein an alkali-soluble thermoplastic resin layer and an oxygen barrier layer are provided between the support and the photosensitive colred resin layer.

3) The photosensitive sheet wherein the photosensitive colored resin layer contains the dye in an amount of 0.5 to 10 weight %.

4) The photosensitive sheet wherein the color of the dye disappeared when the photosensitive colored resin layer is heated at 200° C.for one hour.

5) The photosensitive sheet wherein the color of the dye disappeared when the photosensitive colored resin layer is exposed to light in a radiation energy of 100 mj/cm$^2$. It is preferred to employ light having a wavelength of 365 nm for making the colred resin layer colorless. 6) The photosensitive sheet wherein the photosensitive colored resin layer has alkali-soluble property.

The photosensitive sheet can be advantageously employed for the following processes.

A process for covering a pixel sheet with a protective layer which comprises the steps of:

preparing a pixel sheet comprising a light-transmissive substrate and colored pixels which are arranged on the substrate separately from each other with a space area or a black resin area;

preparing a photosensitive sheet which comprises a support and a photosensitive colored resin layer thereon containing a dye whose color disappears by application of heat;

examining evenness of the surface of photosensitive colored resin layer by applying light onto the surface;

combining the pixel sheet and the photosensitive sheet under the condition that the pixels and space area both are brought into contact with the photosensitive colored resin layer to give a combined body;

separating the support of the photosensitive sheet from the combined body, leaving the photosensitive colored resin layer on the pixel sheet;

exposing to light the pixel sheet having the photosensitive colored resin layer thereon so that the photosensitive colored resin layer is cured; and heating the light-exposed colored resin layer on the pixel sheet so that the colored resin layer is made colorless and the curing further proceeds.

A process for covering a pixel sheet with a protective layer which comprises the steps of:

preparing a pixel sheet comprising a light-transmissive substrate and colored pixels which are arranged on the substrate separately from each other with a space area or a black resin area;

preparing a photosensitive sheet which comprises a support and a photosensitive colored resin layer thereon containing a dye whose color disappears by application of light;

examining evenness of the surface of photosensitive colored resin layer by applying light onto the surface;

combining the pixel sheet and the photosensitive sheet under the condition that the pixels and space area both are brought into contact with the photosensitive colored resin layer to give a combined body;

separating the support of the photosensitive sheet from the combined body, leaving the photosensitive colored resin layer on the pixel sheet;

exposing to light the pixel sheet having the photosensitive colored resin layer thereon so that the photosensitive colored resin layer is cured and the resin layer is made colorless; and heating the light-exposed colored resin layer on the pixel sheet so that the curing further proceeds.

Preferred embodiments of the processes of the invention are as follows:

1) The processes wherein the pixels are composed of red, green and blue pixels.

2) The processes wherein the pixel sheet is provided with a black resin layer (black matrix) in the space area between the pixels.

3) The processes wherein as the photosensitive sheet, employed is a sheet obtained by examining visually the evenness of surfaces of photosensitive colored resin layers for forming the protective layer and selecting a photosensitive colored resin layer of good evenness.

4) The processes wherein the step of exposing to light the pixel sheet is conducted by imagewise exposing to light the pixel sheet having the photosensitive colored resin layer and developing the resin layer.

The photosensitive sheet of the invention has the photosensitive colored resin layer containing a dye whose color disappears by application of heat or light. The photosensitive colored resin layer has color before the photosensitive sheet is employed for forming a protective layer. Therefore, the evenness of the resin layer can be easily examined by visually observing the color conditions of the surface of the resin layer using light (e.g., visual rays or yellow rays) emitted from an ordinary light source.

The color of the resin layer which is disadvantageous when the resin layer serves as a protective layer on the pixel sheet can be removed by light exposure or heating treatment which is carried out during the process for forming the protective layer on the pixels, whereby a colorlesss transparent protective layer can be finally formed. Hence, the color of the resin layer does not disturb the use of the resin layer as the protective layer of the pixel sheet.

As is mentioned above, it can be easily and accurately conducted by observation of the surface of the photosensitive colored resin layer for forming the protective layer as to whether the surface of the protective layer is even or not. Therefore, the use of the photosensitive sheet of the invention enables the preparation of a color filter provided with a protective layer in good productivity.

Further, variation of a thickness of the photosensitive colored resin layer of the photosensitive sheet can be precisely controlled by measuring the density of the color of the resin layer (e.g., using a densitometer). Furthermore, defects (e.g., pinhole) of the surface of the photosensitive colored resin layer can be easily detected.

DETAILED DESCRIPTION OF THE INVENTION

The process for covering a pixel sheet with a protective layer of the invention and the photosensitive sheet advantageously employable for the process are explained below in more detail. The pixel sheet is generally referred to as a color filter.

Figure 1:
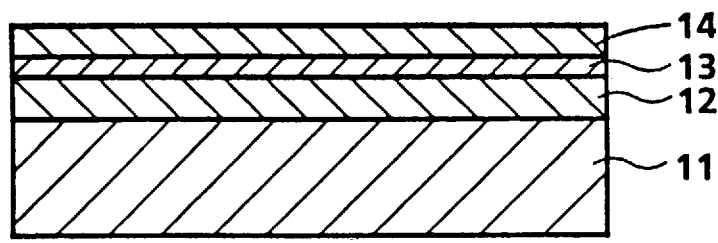
FIG. 1 is a section view of a pixel sheet provided with a protective layer according to the present invention.

The photosensitive sheet for forming the protective layer is explained in detail by referring to FIG. 1.

On a support 11, an alkali-soluble thermoplastic resin layer 12, an oxygen barrier layer (intermediate layer) 13 and a photosensitive colored resin layer 14 (for forming a protective layer) are provided in order. The photosensitive colored resin layer 14 contains as a colorant a dye whose color disappears by application of heat or light. Though the alkali-soluble thermoplastic resin layer 12, and the oxygen barrier layer 13 may be not formed, these layers is preferably formed in order to precisely transfer the photosensitive colored resin layer 14 onto the pixels (and black matrix) and to give a high photosensitivity to the resin layer. In more detail, the alkali-soluble thermoplastic resin layer 12 has a low softening point, and therefore when the photosensitive sheet is superposed under heating on the pixel sheet, the photosensitive colored resin layer 14 closely adheres to the pixels and black matrix of the pixel sheet. Hence the photosensitive colored resin layer 14 can be precisely transferred onto the pixels (and black matrix) so that bubbles are not incorporated between the resin layer 14 and the pixels and black matrix. The oxygen barrier layer has a low oxygen permeability and therefore the photosensitive colored resin layer 14 scarcely comes in contact with oxygen to show a high photosensitivity.

The photosensitive colored resin layer 14 of the photosensitive sheet has color and therefore evenness of the resin layer and variation of its thickness can be easily examined by visually observing the coloring conditions (e.g., color density) of the surface of the resin layer using light (e.g., visual rays or yellow rays) emitted by an ordinary light source. For example, the variation of the thickness of the photosensitive colored resin layer of the photosensitive sheet can be precisely checked and controlled by measuring the density of the color of the resin layer by means of a densitometer. Furthermore, defects (e.g., pinhole) of the surface of the resin layer can be detected.

The photosensitive colored resin layer generally comprises the above-mentioned, an alkali-soluble polymer, a photopolymerizable monomer having an ethylenically unsaturated double bond and a photopolymerization initiator.

The dye employable in the invention is one whose color disappears by application of heat or light. The dye whose color disappears by application of heat generally is one whose color disappears by heating the dye when it is heated at 200° C.(preferably 180° C.) for one hour. Application of heat to the dye brings about decomposition or oxidation of the dye to change its structure, or brings about evaporation or sublimation of the dye. The protective layer (i.e., photosensitive colored resin layer losing its color) preferably shows transmittance of not less than 90% for parallel rays of wavelengths of 400 to 800 nm. The transmittance is measured with respect to a composite composed of a glass plate and the photosensitive colored resin layer thereon.

Examples of the dyes decomposing by heating include dialkylamine triphenylmethane dyes such as Aizen Malachite green, hydrochloric acid salt of Malachite Green, and Aizen Diamond Green. Examples of the dyes subliming by heating include Orient Oil Brown, Methyl Yellow, Sumikaron Brilliant Blue-B and 1,3,5-triphenyltetrazolium formazan.

Examples of the dyes losing its color by heating other than the above dyes include those satisfying the evaluation of stain resistance in a test for fastness to sublimation (conducted under the conditions of 180° C. and one hour or less) in the range of "1" to "3", which are described "Dye Handbook" (Edited by Organic Synthetic Chemistry Association, printed on Jul. 20, 1970 by Maruzen). Examples of these dyes include C.I. Disperse Yellow 8, 31 and 72, C.I. Disperse Orange 1, 3, 20 and 21, C.I. Disperse Red 15, 55, 60 and 65, C.I. Disperse Violet 8, 23, 26 and 37, C.I. Disperse Blue 20, 26, 55, 56, 72, 90, 91, 92 and 106, C.I. Disperse Black 29, Diacellition Direct Black B M/D (available from Mitsubishi Chemical Industries, Ltd.), Sumikaron Violet RS (available from Sumitomo Chemical Co., Ltd.), Dianix Fast Sky Blue B M/D (available from Mitsubishi Chemical Industries, Ltd.), Miketon Polyester Blue BCL, GRN (available from Mitsui Petrochemical Industries, Ltd.) and Kayaron Polyester Navy Blue GF (available from Nippon Kayaku Co., Ltd.).

The dyes decomposing by heating are preferred in view of suitability for heating machines and environmental pollution.

The dye whose color disappears by application of light (preferably UV light) generally is one whose color disappears by exposing the dye to light in a radiation energy of 100 mj/cm$^2$. Further, the dye is preferably decomposed by exposing to UV light having a wavelength of 365 nm to lose its color. The exposure to UV light in the radiation energy of 100 mj/cm$^2$ corresponds to the conditions that a photosensitive colored resin layer containing the specific dye in 2 weight % formed on a support is exposed to UV light of a mercury lamp (500 W/cm) whose main wavelength is 365 nm for 25 seconds so that the lamp is placed on the resin layer at a distance of 60 cm.

Examples of the dyes include compounds which are employed as materials forming a contrast enhanced layer (CEL) for a photoresist. Examples of the compounds include diallylnitron (CEM, available from General Electric Co. (GE)), water-soluble diazonium salt or stilbazolium salt described in "Collected abstracts of Applied Physical Society" (32nd, Spring, pp. 296, 1985) and "Collected Abstracts of Applied Physical Society"(33rd, Spring, pp. 314, 1986), 1-morpholino 3-octyloxy-4-diazophenylhexafluorophosphate, 2,4bisisobutyl-1-isopropoxyphenylcarbamoylphenyldiazohexa fluorophosphate and 3-benzoyl-7-methoxycoumarin.

The dye whose color disappears by application of heat or light is preferably contained in the photosensitive colored resin layer in an amount of 0.5 to 10 weight %, especially in an amount of 0.5 to 5 weight %. When the amount is less than 0.5 weight %, the resultant resin layer may show extremely low optical density not to evaluate the evenness of the surface. When the amount is over 10 weight %, the resultant protective layer may show low hardness and poor resistance to chemical agents.

The photosensitive colored resin layer for forming-the protective layer preferably comprises the dye (colorant), an alkali-soluble polymer, a photopolymerizable monomer having an ethylenically unsaturated double bond and a photopolymerization initiator.

Examples of the above alkali-soluble polymers include polymers having a carboxyl group at side-chain such as copolymers of methacrylic acid and other monomer (e.g., benzyl (meth)acrylate), copolymers of acrylic acid and other monomer (e.g., benzyl (meth)acrylate), copolymers of itaconic acid and other monomer, copolymers of crotonic acid and other monomer and copolymers of maleic acid and other monomer, and copolymers of maleic acid and other monomer which is partially esterfied, as described in U.S. Pat. No. 4,139,391, Japanese Patent Provisional Publications No. 59(1984)-44615, No. 59(1984)-53836 and No. 59(1984)-71048, and Japanese Patent Publications No. 54(1979)-34327, No. 58(1983)-12577 and No. 54(1979)-25957; cellulose derivatives having a carboxyl group at sidechain; and adducts of polymers having a hydroxyl group with cyclic anhydride. Especially, preferred are copolymers of benzyl (meth)acrylate and (meth)acrylic acid, and copolymer made of three or more kinds of monomers such as benzyl I,A (meth)acrylate, (meth)acrylic acid and other monomer, which are described in U.S. Pat. No. 4,139,391.

The alkali-soluble polymer preferably has an acid value of 30 to 400 mg·KOH/g and a weight average molecular weight of 1,000 to 300,000. The alkali-soluble polymer is generally contained in the resin layer in an amount of 10 to 95 weight %, especially in amount of 20 to 90 weight %. When the polymer is contained in less than 10 weight %, the photosensitive colored resin layer shows high tackiness. When the polymer is contained in more than 95 weight %, the photosensitive colored resin layer shows a low photosensitivity and the resultant image shows a low strength.

The photosensitive colored resin layer can contain the alkali-insoluble polymer so long as the developing property does not become poor. Examples of the polymers include alcohol-soluble polyamide (e.g., nylon) and epoxy resin.

The photosensitive colored resin layer contains a photopolymerization initiator capable of being activated by activating rays. Examples of the initiators include bicinnalpolyketaldonyl compounds disclosed in U.S. Pat. No. 2,367,660, acyloin ether compounds disclosed in U.S. Pat. No. 2,448,828, aromatic acyloin compounds substituted with α-hydrocarbon disclosed in U.S. Pat. No. 2,722,512, multiring quinone compounds disclosed in U.S. Pat. Nos. 3,046,127 and No. 2,951,758, a combination of triarylimidazole dimmer and p-aminoketone disclosed in U.S. Patent No. 3,549,367, benzothiazole compounds and trihalomethyl-s-triazine compounds described in Japanese Patent Publication No. 51(1976)-48516, trihalomethyl-s-triazine compounds described in U.S. Pat. No. 4,239,850 and trihalomethyloxadiazole compounds described in U.S. Pat. No. 4,212,976. Preferred are trihalomethyl-s-triazine compounds, trihalomethyloxadiazole compounds and triarylimidazole dimer.

The photopolymerization initiator may be either alone or as a mixture of two or more kinds of them. The photopolymerization initiator is preferably contained in the photosensitive colored resin composition in the range of 0.5 to 20 weight %, especially in the range of 1 to 15 weight %. When the initiator is contained in less than 0.5 weight %, the photosensitive colored resin layer may show a low photosensitivity and the resultant image may show a low strength. Even if the initiator is contained in more than 20 weight %, improvement of these properties is not observed.

The photosensitive colored resin composition contains a photopolymerizable monomer having an ethylenically unsaturated double bond in its molecule. Examples of the photopolymerizable monomers include monomer compounds having a boiling point of 100° C. or higher under atmospheric pressure and at least one ethylenically unsaturated group. Examples of the photopolymerizable monomers include monofunctional acrylates or methacrylates such as polyethylene glycol mono (meth) acrylate, polypropylene glycol mono (meth) acrylate and phenoxyethyl (meth)acrylate; polyfunctional acrylates or methacrylates such as polyethylene glycol di(meth)acrylate, polypropylene glycol di(meth)acrylate, trimethylolethane tri(meth)acrylate, trimethylolpropane tri(meth)acrylate, trimethylolpropane di(meth)acrylate, neopenthyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane tri((meth)acryloyloxypropyl) ether, tri((meth)acryloyloxyethyl) isocyanurate, tri((meth)acryloyloxyethyl) cyanurate and glycerol tri(meth)acrylate; compounds obtainable by adding ethylene oxide or propylene oxide to a polyol such as trimethylolpropane or glycerol and reacting (meth)acrylic acid or (meth)acryloyl chloride with hydroxyl groups of the polyol; urethane (meth) acrylates described in Japanese Patent Publications No. 48(1973)-41708 and No. 50(1975)6034 and Japanese Patent Provisional Publication No. 51(1976)-37193; polyester (meth)acrylates described in Japanese Patent Provisional Publication No. 48 (1973)-64183 and Japanese Patent Publications No. 49(1974)-43191 and No. 52(1977)-30490; and epoxy (meth)acrylates of reaction product of epoxy resin and (meth)acrylic acid. Preferred are trimethylolpropane tri(meth)acrylate, pentaerythritol tetra(meth)acrylate, dipentaerythritol hexa(meth)acrylate and dipentaerythritol penta (meth)acrylate.

The photopolymerizable monomer may be either alone or as a mixture of two or more kinds. The photopolymerizable monomer is preferably contained in the photosensitive colored resin layer in the range of 5 to 50 weight %, especially in the range of 10 to 40 weight %. When the photopolymerizable monomers is contained in less than 5 weight %, the photosensitive colored resin layer may show a low photosensitivity and the resultant image may show a low strength. When the photopolymerizable monomer is contained in more than 50 weight %, the resultant photosensitive colored resin layer may shows undesirable tackiness.

The photosensitive colored resin layer may contain a thermal polymerization inhibitor. Examples of the thermal polymerization inhibitors include hydroquinone, p-methoxyphenol, di-t-butyl-p-cresol, pyrogallol, t-butylcatechol, benzoqinone, 4,4'-thiobis(3-methyl-6-t-butylphenol), 2,2'methylenebis(4-methyl-6-t-butylphenol), 2-mercaptobenzimidazole and phenothiazine.

The photosensitive colored resin layer may contain known additives such as plasticizer, surface active agent and solvent, if necessary.

A coating solution for forming the photosensitive colored resin layer can be obtained, for example, by dissolving or dispersing the dye in a solution of the polymer binder in an appropriate solvent and further adding other materials into the mixture.

The photosensitive colored resin layer is, for example, formed by coating the coating solution on the support (film), and drying the coated layer. Examples of known coaters employable for the coating include a spinner, a whirler, a roller coater, a curtain coater, a knife coater, a wire-bar coater and an extruder.

The photosensitive black resin layer preferably has a thickness of 0.5 to 10 μm, especially 1 to 5 μm.

The above photosensitive sheet prepared by forming the photosensitive colored resin layer on the support (temporary support) preferably has an alkali-soluble thermoplastic resin layer (which is soluble in an aqueous alkaline solution) and an oxygen barrier layer (intermediate) between the support and photosensitive colored resin layer, as shown in FIG. 1.

The support preferably have a good releasable property from the alkali-soluble thermoplastic resin layer and chemical and thermal stability, and further comprises a flexible material.

Examples of the support films include thin films such as a Teflon film, a polyethylene terephthalate (PET) film, a polycarbonate film, a polyethylene film and a polypropylene film; and composite thereof. To obtain the good releasability, it is preferred that the substrate is not subjected to a surface treatment and not provided with a subbing layer such as a gelatin layer. The thickness of the substrate is preferred in the range of 5 to 300 μm, especially 20 to 150 μm.

Resin materials employable in the alkali-soluble thermoplastic resin layer preferably have a softening point of not higher than 80° C. Example of the materials include a saponified product of ethylene/acrylic ester copolymer, a saponification product of styrene/(meth)acrylic ester copolymer, a saponified product of vinyl toluene/(meth)acrylic ester copolymer, a saponified product of poly(meth)acrylic ester, and a saponified product of copolymer of monomers such as (meth)acrylate and vinyl acetate. Further, alkali-soluble organic polymers which are selected from those having a softening point of not higher than 80° C. described in "Plastic Seino Binran (Plastic Performance Handbook)" edited by Japan Plastic Industry Association and All Japan Federation of Plastics Molding Industry, published by Industrial Investigation Commission (Oct. 25, 1968) can be employed.

Otherwise, it is possible to use alkali-soluble organic polymers having a softening point of higher than 80° C. by employing the polymers with a plasticizer in combination to lower the softening point to a temperature of not higher than 80° C. Further, in order to control adhesion to the temporary substrate, the organic polymers may contain various other polymers, supercooling substances, adhesion improving agents, surface active agents, mold-releasing agents, etc., so long as the softening temperature does not exceed 80° C. Examples of preferred plasticizers include polypropylene glycol, polyethylene glycol, dioctyl phthalate, diheptyl phthalate, dibutyl phthalate, tricresyl phosphate, cresyl diphenyl phosphate and biphenyl diphenyl phosphate.

The alkali-soluble thermoplastic resin layer preferably has a thickness of not less than 6 $\mu$m. When the thickness is less than 6 $\mu$m, it is difficurlt to compensate unevenness of the substrate when the unevenness is more than 1 $\mu$m. The preferred upper limit of the thickness is 100 $\mu$m, especially 50 pm, from the standpoint of developability and production efficiency.

Known materials can be employed for the oxygen barrier layer (intermediate layer) so long as they are dispersible or soluble in water or an aqueous alkaline solution and show low oxygen permeability. Examples of the materials include vinyl ether/maleic anhydride copolymers, water-soluble salts of carboxyalkyl celluloses, water-soluble cellulose ethers, water-soluble salts of carboxyalkylated starches, polyvinyl alcohol, polyvinyl pyrrolidone, various polyacrylamides, various water-soluble polyamides, water-soluble salts of polyacrylic acid, gelatin, polyethylene oxide, water-soluble salts of various starches and their analogues, styrene/maleic anhydride copolymer, maleate resin, and their combinations.

Of these materials, a combination of polyvinyl alcohol and polyvinyl pyrrolidone is preferred. Polyvinyl alcohol preferably has a degree of saponification of not less than 80%. The oxygen barrier layer preferably contains the polyvinyl pyrrolidone in an amount of 1 to 75 weight %, more preferably 1 to 60 weight % and especially 10 to 50 weight %. When the content of polyvinyl pyrrolidone is less than 1 weight %, satisfactory adhesion to the photosensitive colored resin layer may not be obtained. When the content exceeds 75 weight %, oxygen barrier property of the layer may become insufficient.

The thickness of the oxygen barrier layer preferably is in the range of 0.1 to 5 $\mu$m, especially 0.5 to 2pm. When the thickness is less than 0.1 $\mu$m, enough oxygen permeability may not been imparted. When the thickness is more than 5 $\mu$m, it may be necessary to prolong a time period for development or removal of the oxygen barrier layer.

The photosensitive colored resin layer is formed on the oxygen barrier layer.

The process for the preparation of the pixel sheet provided with the protective layer of the invention, for example, can be performed in the following manner. The process is explained by referring to FIGS. 2, 3A, 3B and 3C.

Figure 2:
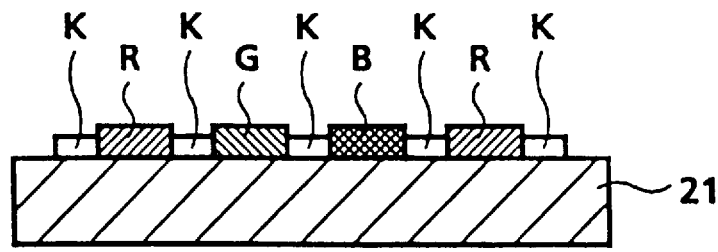
FIG. 2 is a section view of a pixel sheet having black matrix (color filter having no protective layer) employed in the invention.

The pixel sheet provided with a black matrix and no protective layer is shown in FIG. 2. On a light-transmissive substrate 21, red, green and blue pixels comprising minute colored layers (red pixel R, green pixel G and blue pixel B) are provided, and a black matrix K is formed in the space area (gap area) between the pixels.

The pixels are generally composed of three kinds of minute colored layers having color different from one another as above. The pixels, however, can be composed of two minute colored layers having different color from each other, or four or more minute colored layers.

The light-transmissive substrate generally is in the form of plate or sheet. Examples of the light-transmissive substrates include known glass plates such as a soda-lime glass plate having a silicon dioxide layer thereon, a low thermal expansion glass plate, a glass plate containing no alkali, and a silica glass plate, and various plastic sheets.

The red, green and blue pixels are generally formed-on the light-transmissive substrate by transferring a photosensitive transfer sheet having a photosensitive red resin layer for forming the red pixel onto the support, imagewise exposing and developing the photosensitive red resin layer to form a red pixel, and forming green and blue pixels in the same manner as in the formation of the red pixel. Otherwise, the photosensitive colored resin layer for each pixel can be formed by-means of a coating method, or may be formed by printing a colored ink or by dying a photosensitive gelatin pattern.

The photosensitive sheet employable in the preparation of the pixels and black matrix also preferably has a structure comprising a support, an alkali-soluble thermoplastic resin layer, an oxygen barrier layer and a photosensitive colored resin layer, which is similar to the photosensitive sheet for giving the protective layer to the pixel sheet.

The red, green and blue pixels can be placed in any arrangement. Examples of the arrangements include a mosaic type arrangement, a triangle type arrangement, and a four pixel type arrangement.

The process for covering the pixel sheet with the protective layer of the invention can be performed employing the photosensitive sheet for forming the protective layer shown in FIG. 1 and the pixel sheet provided with a black matrix shown in FIG. 2, in the following manner. The process is explained by referring to FIGS. 3A, 3B and 3C.

A number of photosensitive sheets for providing a protective layer are prepared as described previously, and then the prepared sheets are visually examined on evenness of the surface of the photosensitive colored resin layer by applying light onto the surface of the photosensitive colored resin layer. The examination can be performed utilizing an optical apparatus. The photosensitive sheets whose photosensitive colored resin layer has undesired unevenness are removed from the production line and thrown away.

(1) The photosensitive sheet having appropriate evennesss is placed on the pixel sheet so that the photosensitive colored resin layer 14 is in contact with the surfaces of the pixels (red pixel R, green pixel G and blue pixel B) and the black matrix K between the pixels. The resultant composite has a structure shown in FIG. 3A.

Figure 3A:
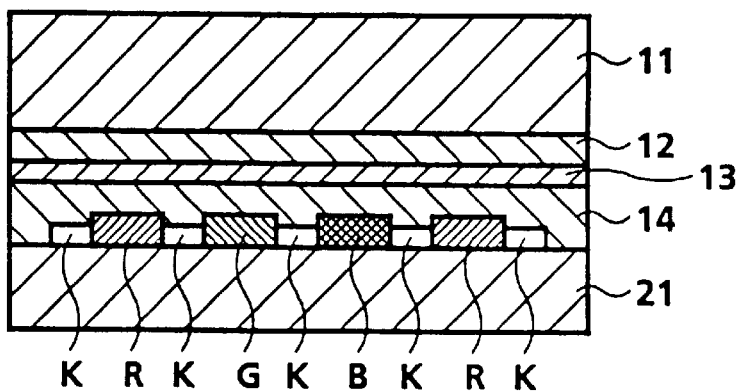
FIGS. 3A, 3B and 3C illustrate section views for explaining a process for covering the pixel sheet with a protective layer according to the present invention.
Figure 3B:
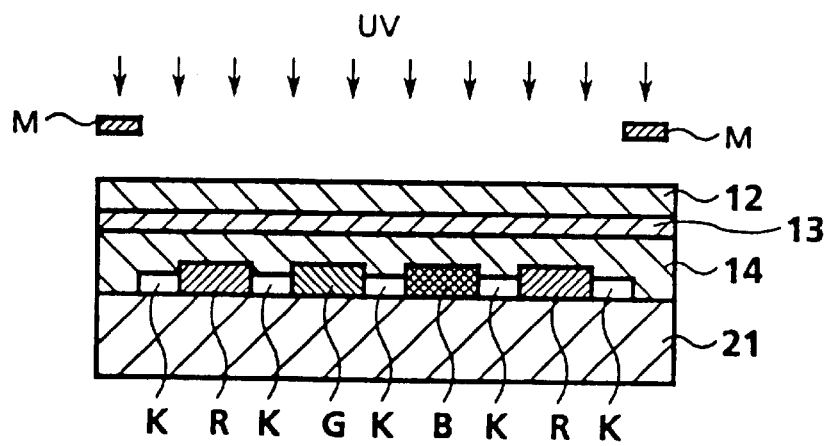

(2) The support is separated from the composite to leave the photosensitive colored resin layer 14 together with the oxygen barrier layer 13 and the thermoplastic resin layer 12 on the surface of the pixels R, G. B and the black matrix K. Subsequently, the surface of the thermoplastic resin layer 12 is exposed to a UV light through a photomask M, as shown in FIG. 3B. The area under the photomask M is not cured.

The photosensitive colored resin layer 14 in the area (i.e., photomask area) other than those of pixels and black matrix are removed by development. In the figures, peripheral area of the pixel sheet is removed. Otherwise, the photosensitive colored resin layer 14 may be wholly exposed to a UV light using no photomask.

In the invention, the photosensitive colored resin layer 14 (i.e., which is turned to be a protective layer on the pixel sheet) is preferably formed only in the area of pixels and black matrix. A protective layer in the peripheral area of the pixel sheet may cause lowering of adhesion of a sealing agent in the peripheral area. The sealing agent is used for combining the electrode substrates during the process of assembling a display device. Otherwise, the protective layer in the peripheral area may cause peelingoff of the protective layer in the peripheral area when a lead-out electrode is provided. (3) Subsequently, the exposed colored resin layer 14 is developed to remove the resin layer in the area under the photomask. In the development, the oxygen barrier layer 13 and the thermoplastic resin layer 12 are also removed. In the case of using no photomask, this development step may be omitted. However, the oxygen barrier layer 13 and the thermoplastic resin layer 12 are usually transferred onto the pixel sheet together with the photosensitive colored resin layer 14, and therefore the development generally is carried out to remove these layers.

Figure 3C:
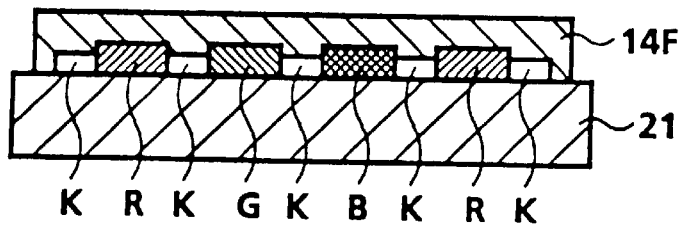

Thereafter, the pixel sheet having the photosensitive colored resin layer is heated to sufficiently cure the resin layer (i.e., causing unreacted double bond to react) as well as to cause the color of the resin layer to disappear, whereby a protective layer 14F is formed, as shown in FIG. 3C.

When the dye contained in the photosensitive colored resin layer is one whose color disappears by applying of UV light, the color disappear in the exposing step (2). In the case that the color does not disappear, the resin layer is further heated.

The heat treatment after the exposure is generally carried out at a temperature of 120° to 250° C. for a time period of 10 to 300 minutes, so as to cure unreacted portion of materials.

As described above, in the step (2) of the process of the invention, the pixel sheet having the photosensitive colored resin layer is exposed to a UV light through a photomask.

Light sources employed for the irradiation are selected depending on photosensitivity of materials employed in the photosensitive colored resin layer. Examples of the light sources include a super high pressure mercury lamp, a xenon lamp, a carbon-arc lamp and an argon laser. Further, a filter of which transmittance of a light at a wavelength range of not more than 400nm is in the range of not higher than 2%, can be employed together with the lamp, as described in Japanese Patent Provisional Publication No. 6(1994)-59119.

As a developing solution for development of the exposed photosensitive colored resin layer, an aqueous alkaline solution of low alkali content is generally employed. The solution may further contain a small amount of an organic solvent miscible with water. Preferred examples of the alkaline substances include alkali metal hydroxides (e.g., sodium hydroxide and potassium hydroxide), alkali metal carbonates (e.g., sodium carbonate and potassium carbonate), alkali metal bicarbonates (e.g., sodium hydrogen carbonate and potassium hydrogen carbonate), alkali metal silicates (e.g., sodium silicate and potassium silicate), alkali metal metasilicates (e.g., sodium metasilicate and potassium metasilicate), triethanolamine, diethanolamine, monoethanolamine, morpholine, tetraalkylammonium hydroxides (e.g., tetramethylammonium hydroxide), and sodium tertialy phosphate. The aqueous alkaline solution preferably con-. tains the alkali in an amount of 0.01 to 30 weight %, and preferably shows pH of 8to 14.

Examples of the solvents miscible with water include methanol, ethanol, 1-propanol, 2-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethylformamide, dimethylacetamide, hexamethylphosphoric triamide, $\epsilon$-caprolactam, methyl lactate, ethyl lactate, and N-methylpyrrolidone. The aqueous alkaline solution preferably contains the solvent in an amount of 0.1 to 30 weight %.

The aqueous alkaline solution (i.e. developing solution) can contain known surface active agent. The aqueous alkali solution preferably contains the surface active agent in an amount of 0.01 to 10 weight %.

The developing solution can be employed for receiving the composite therein or by spraying. Removal of the unexposed portions of the photosensitive colored resin layer can be carried out by rubbing the surface of the resin layer with a rotating brush or a sponge having good wetting property; or by appropriately controlling a spraying pressure during spraying of the developing solution. The developing solution is preferably used at a temperature of room temperature to 40° C. After the developing step, a washing procedure can be carried out.

After the developing step, the step of heating the pixel sheet provided with a black matrix and the resin layer (protective layer) is carried out as mentioned above. In more detail, the pixel sheet provided with a black matrix and the resin layer is placed in an electric oven or a dryer, or infrared rays are irradiated on the resin layer using an infrared lamp. A temperature and time period for the heating usually depend upon composition of the photosensitive colored resin layer or its thickness.

The present invention is further described by the following Example. The term "part" means "weight part", unless otherwise defined.

EXAMPLE 1

A coating solution having the following composition was coated on a polyethylene terephthalate film (temporary support, thickness: 75 μm) and dried to form an alkali-soluble thermoplastic resin layer having a thickness of 10 μm.

[Composition of coating solution for forming alkali-soluble thermoplastic resin layer]

| | |
|---|---|
| Styrene/acrylic acid copolymer (molar ratio of monomers: 60/40, weight average molecular weight: 80,000) | 15.0 parts |
| 2,2-Bis[4-(methacryloxypolyethoxy)phenyl] propane | 7.0 parts |

[Composition of coating solution for forming alkali-soluble thermoplastic resin layer]

| | |
|---|---|
| F-176 (fluorine containing surface active agent; available from Dainippon Ink & Chemicals Inc.) | 1.5 parts |
| Propylene glycol monomethyl ether | 28.0 parts |
| Methyl ethyl ketone | 27.0 parts |

On the alkali-soluble thermoplastic resin layer, a coating solution having the following composition was coated and dried to form an oxygen barrier layer having a thickness of 2 $\mu$m.

[Composition of coating solution for forming oxygen barrier layer]

| | |
|---|---|
| Polyvinyl alcohol (saponification degree: 80%, PVA205, available from Kuraray Co., Ltd.) | 19 parts |
| Isopropyl alcohol | 100 parts |
| Deionized water | 100 parts |

On the oxygen barrier layer, a coating solution having the following composition was coated and dried to form a photosensitive colored resin layer for forming protective layer having a thickness of 3 $\mu$m, and then a covering film of polypropylene (thickness: 12 $\mu$m) was laminated on the photosensitive colored resin layer, to prepare a photosensitive sheet for forming a photosensitive colored resin layer.

[Composition of coating solution for forming photosensitive colored resin layer]

| | |
|---|---|
| Copolymer of styrene/maleic anhydride modified with benzylamine (molar ratio of monomers: 60/40, reacted the maleic anhydride with equimolar benzylamine, acid value: 150 mg · KOH/g, weight average molecular weight; 13,000) | 14 parts |
| F-176 (fluorine containing surface active agent; available from Dainippon Ink & Chemicals Inc.) | 0.01 part |
| Hydroquinone monomethyl ether | 0.01 part |
| Dipentaerythritol hexaacrylate monomer | 11.0 parts |
| 2-(p-Butoxystyryl-5-trichloromethyl) 1,3,4-oxadiazole | 0.5 part |
| Aizen Malachite Green (available from Hodogaya Chemical Co., Ltd.) | 0.5 part |
| Methanol | 25.0 parts |
| Propylene glycol monomethyl ether | 25.0 parts |
| Methyl ethyl ketone | 25.0 parts |

An optical density (OD) of the resultant photosensitive colored resin layer was measured by the use of a Macbeth densitometer (TD-504) to give 1. The surface of the photosensitive colored resin layer was observed under irradiation of yellow light to examine its evenness (which may be produced when the coating is carried out unevenly).

As a result, it was confirmed that the surface showed uniform hue and therefore it was highly even.

On a glass plate (light-transmissive substrate, thickness: 1.1 mm), a red (R) layer (red pixels), a green (G) layer (green pixels) and a blue (B) layer (blue pixels), each layer having a thickness of 2 $\mu$m, and black matrix between the spaces between the pixels were formed, whereby a pixel sheet (color filter having no protective layer) was obtained.

After the cover film of the photosensitive (transfer) sheet having the photosensitive colored resin layer (for forming a protective layer) prepared above was peeled from the sheet, the sheet was superposed on the pixel sheet having R, G and B pixels and black matrix so that the photosensitive colored resin layer was in contact with the surface of pixel side, and laminated at a feeding rate of 0.3 m/min. by application of pressure (2 kg/m$^2$) and heat (130° C.) using a laminator (First Laminator 8B-550-80, available from Taisei Laminator K.K.). Then, the temporary support (polyethylene terephthalate film) of the photosensitive sheet was separated from the pixel sheet, keeping the thermoplastic resin layer, oxygen barrier layer and photosensitive colored resin layer on the pixel sheet.

Subsequently, the photosensitive colored resin layer was exposed to a UV light using a super high pressure mercury lamp (500 W/cm) at a distance (between the resin layer and UV light source) of 25 cm, through a photomask (for removing circumferential area of the sheet). The exposing was carried out in a radiation energy (exposing amount) of 100 mj/cm$^2$.

Then, the pixel sheet was treated with a treating solution (alkaline agueous solution TPD, available from Fuji Photo Film Co., Ltd.) to remove the alkali-soluble thermoplastic resin layer and oxygen barrier layer, and the exposed photosensitive colored resin layer was developed using a developing solution (1% sodium carbonate aqueous solution) to remove the unexposed portions of the layer, whereby a colored resin layer (i.e., a protective layer) was formed on the pixels and black matrix.

The glass plate having the pixels (and black matrix) and the colored resin layer was placed in an oven and heated at a temperature of 220° C.for 60 minutes to fully cure the colored resin layer, whereby the color of the colored resin layer completely disappeared to form a colorless resin layer (i.e., protective layer). Thus, a color filter having a protective layer was prepared.

Separately, a protective layer was formed on a glass plate (having no pixels and black matrix) in the same manner as in Example 1. The transmittance of the protective layer was measured using a spectrophotometer (UV-240, available from Shimadzu Seisakusho, Ltd.) to 93 to 95% for parallel light having wavelengths of 400 to 800 nm.

What is claimed is:

1. A process for covering a pixel sheet with a protective layer which comprises the steps of:

preparing a pixel sheet comprising a light-transmissive substrate and-colored pixels which are arranged on the substrate separately from each other with a space area or a black resin area;

preparing a photosensitive sheet which comprises a support and a photosensitive colored resin layer thereon containing a dye whose color disappears by application of heat;

examining evenness of the surface of photosensitive colored resin layer by applying light onto the surface;

combining the pixel sheet and the photosensitive sheet under the condition that the pixels and space area both are brought into contact with the photosensitive colored resin layer to give a combined body;

separating the support of the photosensitive sheet from the combined body, leaving the photosensitive colored resin layer on the pixel sheet;

exposing to light the pixel sheet having the photosensitive colored resin layer thereon so that the photosensitive colored resin layer is cured; and heating the light-exposed colored resin layer on the pixel sheet so that the colored resin layer is made colorless and the curing further proceeds.

2. The process of claim 1, wherein the pixels are composed of red, green and blue pixels.

3. A process for covering a pixel sheet with a protective layer which comprises the steps of:

preparing a pixel sheet comprising a light-transmissive substrate and colored pixels which are arranged on the substrate separately from each other with a space area or a black resin area;

preparing a photosensitive sheet which comprises a support and a photosensitive colored resin layer thereon containing a dye whose color disappears by application of light;

examining evenness of the surface of photosensitive colored resin layer by applying light onto the surface;

combining the pixel sheet and the photosensitive sheet under the condition that the pixels and space arealboth are brought into contact with the photosensitive colored resin layer to give a combined body;

separating the support of the photosensitive sheet from the combined body, leaving the photosensitive colored resin layer on the pixel sheet;

exposing to light the pixel sheet having the photosensitive colored resin layer thereon so that the photosensitive colored resin layer is cured and the resin layer is made colorless; and heating the light-exposed colored resin layer on the pixel sheet so that the curing further proceeds.

4. The process of claim 5, wherein the pixels are composed of red, green and blue pixels.

* * * * *